United States Patent [19]

Wall et al.

[11] Patent Number: 4,514,298
[45] Date of Patent: Apr. 30, 1985

[54] TUBE PRESSURE FILTER

[75] Inventors: George W. Wall, Par; Glyn T. Jones, St. Austell, both of England

[73] Assignee: English Clays Lovering Pochin & Company, Ltd., Cornwall, England

[21] Appl. No.: 576,103

[22] Filed: Feb. 2, 1984

[30] Foreign Application Priority Data

Feb. 7, 1983 [GB] United Kingdom ............... 8303306

[51] Int. Cl.$^3$ ............................................. B01D 29/10
[52] U.S. Cl. ................................. 210/232; 210/350; 210/445; 210/450; 100/211
[58] Field of Search ............... 210/808, 230, 232, 237, 210/238, 350, 351, 352, 356, 445, 450; 100/211

[56] References Cited

U.S. PATENT DOCUMENTS

| | | | |
|---|---|---|---|
| 1,502,552 | 7/1924 | Donnallan | 210/232 |
| 3,753,498 | 8/1973 | Gwilliam | 210/350 |
| 3,762,560 | 10/1973 | Gwilliam | 210/350 |
| 4,174,282 | 11/1979 | Butterworth | 210/232 |
| 4,228,012 | 10/1980 | Pall | 210/323.2 |
| 4,246,122 | 1/1981 | Keat | 210/350 |
| 4,277,338 | 7/1981 | Hoagland | 210/351 |
| 4,334,996 | 6/1982 | Broad | 210/350 |
| 4,366,055 | 12/1982 | Gwilliam | 210/350 |
| 4,430,232 | 2/1984 | Doucet | 210/232 |

FOREIGN PATENT DOCUMENTS

| | | | |
|---|---|---|---|
| 624196 | 7/1961 | Canada | 210/232 |
| 599823 | 3/1978 | U.S.S.R. | 210/232 |
| 719665 | 3/1980 | U.S.S.R. | 210/232 |

Primary Examiner—Ernest G. Therkorn
Attorney, Agent, or Firm—Stefan J. Klauber

[57] ABSTRACT

The outer tubular assembly (4) of the tube pressure filter comprises a cylindrical member (36) and, at each end, an end assembly comprising two annular members (38 and 40) which are releasably secured to the cylindrical member (36) by a split retaining ring (42). The two annular members define a cavity (62) for receiving the lip of a diaphragm (18, FIG. 1). The axially inner annular member (38) defines, with the cylindrical member (36) an annular chamber (56) for receiving fluid under pressure and an annular slot (58) for allowing the fluid to flow between the chamber (56) and the interior of the pressure filter. The split retaining ring (42) engages a groove (52) in the cylindrical member (36), so securing the end assembly to the cylindrical member (36) without the need for welding.

13 Claims, 2 Drawing Figures

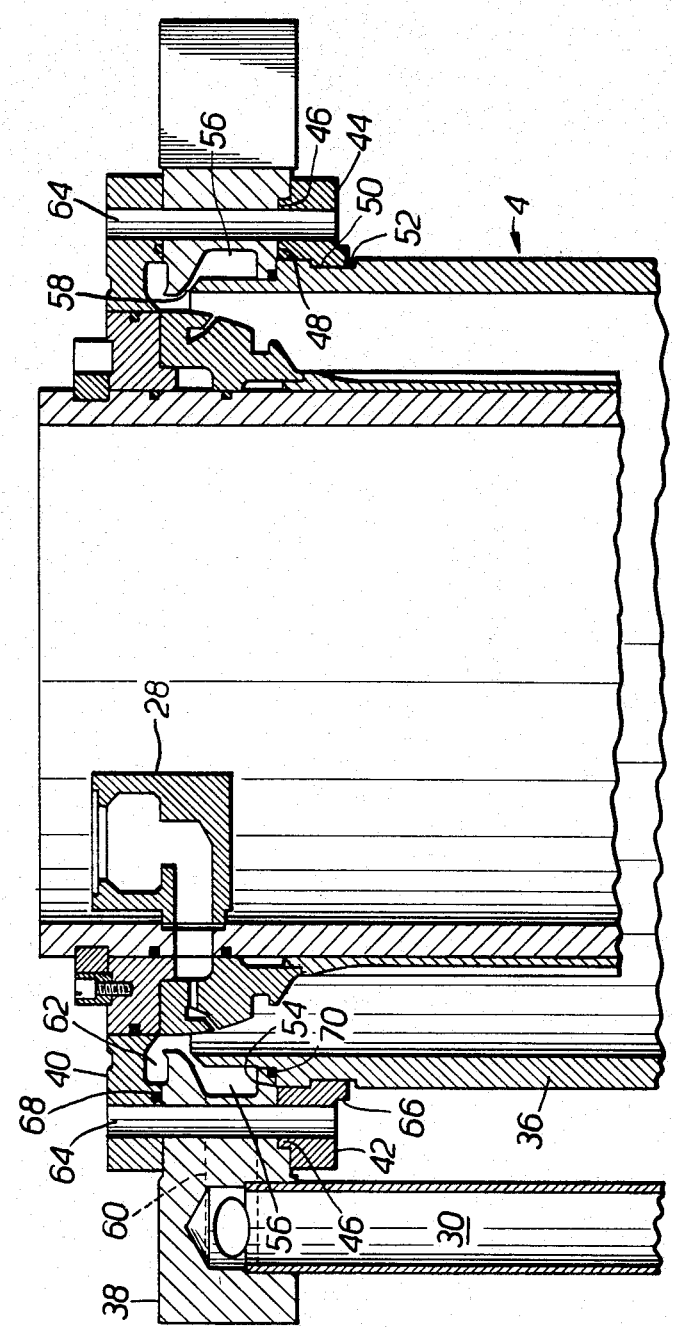

4,514,298

TUBE PRESSURE FILTER

BACKGROUND OF THE INVENTION AND PRIOR ART

This invention relates to a tube pressure filter.

Tube pressure filters are described, for example, in British Patent Specifications Nos. 907,485, 1,240,465 and 1,582,957, in British patent application No. 8301927, and in European Patent Specification No. 0036318. The outer tubular assembly of a tube pressure filter generally comprises a central cylindrical section consisting of, for example, a length of steel tubing of appropriate diameter and wall thickness and two end assemblies, one at each end of the central cylindrical section. Each end assembly includes a collar which is welded to the central cylindrical section.

The weld joining each collar to the central cylindrical section must be impermeable by fluids and must be capable of withstanding pressures of up to 2000 psig (14 MPa.). Such a weld requires the services of a highly skilled welder and is therefore expensive to execute. There is also the risk that the welding operation will distort the ends of the outer tubular assembly to the extent that it is difficult to meet strict tolerances.

SUMMARY OF THE INVENTION

According to the present invention there is provided a tube pressure filter comprising an inner assembly and a generally tubular outer assembly which surrounds the inner assembly to provide between the assemblies an annular chamber which is divided into inner and outer compartments by an impermeable diaphragm disposed within the outer assembly, a filter element disposed within the inner compartment, means for supplying a mixture of a liquid and a particulate solid to the inner compartment and means for supplying fluid under pressure to the outer compartment so as to cause the liquid in the inner compartment to be forced through the filter element leaving the particulate solid material deposited on the filter element, in which the outer assembly comprises a central cylindrical member and two end assemblies, at least one of the end assemblies comprising an annular member which defines with the cylindrical member an annular chamber for receiving the fluid under pressure and passage means extending between the annular chamber and the outer compartment, and retaining means which releasably engages the cylindrical member and to which the annular member is releasably secured to retain the annular member on the cylindrical member.

The end of the central cylindrical section is preferably shaped to provide a shoulder for locating the axially inner wall of the annular member and an annular groove for receiving the retaining means which may be a split ring. The split ring may comprise two or more portions and each portion is preferably provided with a first projection which co-operates with an annular recess in the axially inner wall of the annular member and a second projection which cooperates with the groove in the cylindrical section.

A further annular member may be provided which defines, with the first-mentioned annular member, a cavity receiving an end lip of the diaphragm.

The two annular members and the split ring may conveniently be secured together by a plurality of nut and bolt assemblies.

BRIEF DESCRIPTION OF THE DRAWINGS

FIG. 2 is a sectional view of the top end of the tube pressure filter of FIG. 1 on an enlarged scale.

DETAILED DESCRIPTION OF A PREFERRED EMBODIMENT

Figure 1:
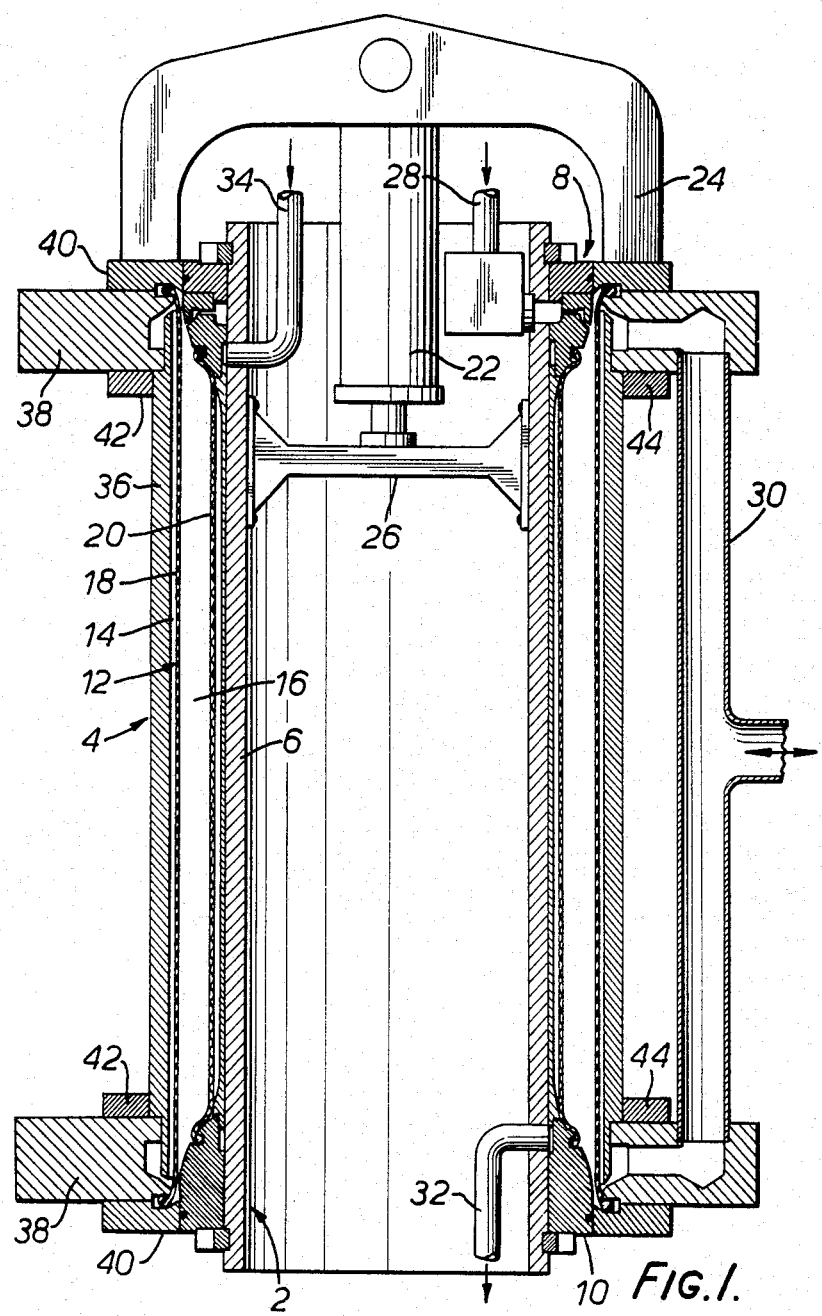
FIG. 1 is a sectional view of a tube pressure filter.

The tube pressure filter shown in FIG. 1 comprises an inner assembly 2 and a generally tubular outer assembly 4. The inner assembly 2 comprises a core 6 in the form of a tubular member to which are riveted two end sections 8 and 10, but alternatively the inner assembly may be constructed in accordance with our co-pending patent application No 0303305. In the position shown in FIG. 1, the end sections 8 and 10 are in sealing engagement with the outer assembly 4 to define an annular chamber 12 betwen the inner and outer assemblies 2 and 4. The chamber 12 is divided into two compartments 14 and 16 by a flexible, impermeable diaphragm 18 which is secured within the outer assembly 4. The outer surface of the inner assembly 2 is provided with a filter element 20.

A fluid operated ram 22 is mounted on a spider 24 which is rigidly fixed to the outer assembly 4. The piston rod of the ram 22 is connected by a crossbar 26 to the tubular member 6.

In operation of the tube pressure filter of FIG. 1, a mixture comprising a liquid and a particulate solid is fed into the inner compartment 16 through a feed conduit 28. When the inner compartment 16 is full, the supply of mixture is terminated by a shut-off valve and fluid, such as water, is supplied under high pressure through an inlet manifold 30 to the outer compartment 14. The pressure of the water acting on the diaphragm 18 forces the liquid component of the mixture through the filter element 20 and it eventually flows to a filtrate outlet conduit 32. During this operation, the solid component of the mixture is deposited on the filter element 20 in the form of a filter cake.

At the end of the pressing operation, the water is withdrawn under vacuum from the outer compartment 14 through the manifold 30, and the ram 22 is actuated to lower the inner assembly 2 relatively to the outer assembly 4, which results in the inner compartment 16 communicating with the outside. Compressed air is then supplied through an inlet conduit 34, and this air passes to the region beneath the filter element 20 to cause the filter cake to be detached so that it falls from the tube pressure filter. The inner assembly 2 is then returned to the position shown in FIG. 1 by the ram 22, and the next cycle begins.

Referring particulary to FIG. 2, the outer assembly 4 comprises a central cylindrical member 36 and two end sections each of which comprises an inner annular member 38, an outer annular member 40 and a split retaining ring comprising two semicircular portions 42 and 44. Each portion 42, 43 of the retaining ring comprises an axial projection 46 which co-operates with an annular recess 48 machined in the inner face of the inner annular member 38 and a radially inwards projection 50 which co-operates with an annular groove 52 machined in the wall of the central cylindrical member 36. A shoulder 54 is also machined in the wall of the central cylindrical member 36 to locate precisely the inner annular member 38 on the central cylindrical section 36. The inner annular member 38 is so shaped that it defines, with the central cylindrical member 36, an annular chamber 56 and a narrow annular slot 58 through which hydraulic fluid can enter the outer compartment 14 of the tube pressure filter. The manifold 30 communicates with the annular chamber 56 through a pair of parallel ducts, one of which is indicated at 60.

The inner annular member 38 and the outer annular member 40 are shaped so as to define between them an annular cavity 62 to receive and retain a lip or annular beading of the impermeable elastic sleeve 18. Holes 64 are provided through the outer annular member 40, the inner annular member 38 and the split retaining ring 42, 44 to accommodate nut and bolt assemblies (not shown) which secure the members of the outer assembly 4 tightly together. A step 66 is provided in the inner wall of the inner annular member 38 to co-operate with the flat faces of the hexagonal nuts to prevent rotation of the nuts when the nut and bolt assemblies are tightened or loosened. A groove accommodating an O-ring seal 68 is provided in the inner wall of the outer annular member 40 and a groove accommodating an O-ring seal 70 is provided in the inner wall of the inner annular member to prevent leakage of fluids under pressure into the holes 20.

The construction described above for the tubular outer assembly 4 has the advantage that the need for welding is avoided, and this makes it possible to provide an outer assembly with end portions manufactured to precise specifications at relatively low cost. In particular it is possible to ensure that the width of the annular slot 14 is uniform and correct to within narrow limits.

We claim:

1. A tube pressure filter comprising:
   an inner assembly;
   a generally tubular outer assembly which surrounds the inner assembly to provide between the assemblies an annular chamber;
   an impermeable diaphragm which is disposed within the outer assembly and which divides the annular chamber into inner and outer compartments;
   a filter element disposed within the inner compartment;
   means for supplying a mixture of a liquid and a particulate solid to the inner compartment; and
   means for supplying fluid under pressure to the outer compartment so as to cause the liquid in the inner compartment to be forced through the filter element leaving the particulate solid material deposited on the filter element, the outer assembly comprising a central cylindrical member and two end assemblies, at least one of the end assemblies comprising an annular member which defines with the cylindrical member an annular chamber for receiving the fluid under pressure and passage means extending between the annular chamber and the outer compartment, and retaining means which releasably engages the cylindrical member and to which the annular member is releasably secured to retain the annular member on the cylindrical member.

2. A tube pressure filter as claimed in claim 1, in which the retaining means comprises a split retaining ring.

3. A tube pressure filter as claimed in claim 2, in which an annular groove is provided in the radially outer wall of the cylindrical member and in which a radially inwardly directed projection is provided on the retaining ring, the projection being received in the groove.

4. A tube pressure filter as claimed in claim 2, in which an axially projecting portion is provided on the retaining ring, and a corresponding recess is provided in the annular member, the axially projecting portion engaging the recess.

5. A tube pressure filter as claimed in claim 1, in which a radially extending face is provided on the cylindrical member, the annular member abutting the radially extending face.

6. A tube pressure filter as claimed in claim 1, in which the end assembly comprises a further annular member which is releasably secured to the first-mentioned annular member.

7. A tube pressure filter as claimed in claim 6, in which the two annular members define an annular cavity receiving an end lip of the diaphragm.

8. A tube pressure filter as claimed in claim 6, in which the first-mentioned annular member is disposed between the retaining means and the further annular member.

9. A tube pressure filter as claimed in claim 1, in which the first-mentioned annular member is releasably secured to the retaining means by at least one nut and bolt assembly.

10. A tube pressure filter as claimed in claim 9, in which the retaining means has an axially extending surface cooperating with a flat of the nut.

11. A tube pressure filter as claimed in claim 1, in which a said end assembly is provided at both ends of the cylindrical member, the end assemblies being substantially identical to each other.

12. A tube pressure filter as claimed in claim 1, in which the passage means is an annular slot.

13. A tube pressure filter comprising:
    an inner assembly;
    a generally tubular outer assembly which surrounds the inner assembly to provide between the assemblies an annular chamber;
    an impermeable diaphragm which is disposed within the outer assembly and which divides the annular chamber into inner and outer compartments;
    a filter element disposed within the inner compartment;
    means for supplying a mixture of a liquid and a particulate solid to the inner compartment; and
    means for supplying fluid under pressure to the outer compartment so as to cause the liquid in the inner compartment to be forced through the filter element leaving the particulate solid material deposited on the filter element, the outer assembly comprising a central cylindrical member and two end assemblies, at least one of the end assemblies comprising a first annular member which defines with the cylindrical member an annular chamber for receiving the fluid under pressure and passage means extending between the annular chamber and the outer compartment, and retaining means which releasably engages the cylindrical member and to which the annular member is releasably secured to retain the annular member on the cylindrical member, a second annular member, and at least one nut and bolt assembly which releasably secures together the first and second annular members and the retaining means.

* * * * *